US007037605B2

United States Patent
Hattori et al.

(10) Patent No.: US 7,037,605 B2
(45) Date of Patent: May 2, 2006

(54) MAGNETIC PARTICLE COATED MATERIAL CONTAINING MAGNETIC PARTICLES HAVING CUAU TYPE OR CU$_3$AU TYPE FERROMAGNETIC ORDERED ALLOY PHASE, AND METHOD FOR PRODUCING THE SAME

(75) Inventors: Yasushi Hattori, Kanagawa (JP); Koukichi Waki, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 10/786,067

(22) Filed: Feb. 26, 2004

(65) Prior Publication Data

US 2004/0170868 A1    Sep. 2, 2004

(30) Foreign Application Priority Data

Feb. 28, 2003    (JP)    ............................. 2003-053285

(51) Int. Cl.
*G11B 5/66*    (2006.01)
*G11B 5/70*    (2006.01)

(52) U.S. Cl. ..................................... 428/827
(58) Field of Classification Search ............ 428/694 T, 428/694 TM, 900, 323, 328, 336, 212, 827
See application file for complete search history.

(56) References Cited

U.S. PATENT DOCUMENTS

| 5,456,986 | A | 10/1995 | Majetich et al. |
| 6,127,039 | A * | 10/2000 | Saitoh et al. ............ 428/425.9 |
| 6,162,532 | A | 12/2000 | Black et al. |
| 6,254,662 | B1* | 7/2001 | Murray et al. ................ 75/348 |
| 6,262,129 | B1 | 7/2001 | Murray et al. |
| 6,302,940 | B1 | 10/2001 | Murray et al. |

FOREIGN PATENT DOCUMENTS

| JP | 2001-93130 A | 4/2001 |
| JP | 2001-256631 A | 9/2001 |
| JP | 2002-157727 A | 5/2002 |

* cited by examiner

*Primary Examiner*—Holly Rickman
(74) *Attorney, Agent, or Firm*—Sughrue Mion, PLLC

(57) ABSTRACT

The present invention is a magnetic particle coated material comprising: a first support having a magnetic layer formed on one surface thereof; and a second support having a magnetic layer formed on one surface thereof, wherein the first support and the second support are attached to each other so that the other surfaces thereof on which the magnetic layers are not formed face each other, and the magnetic layers comprise magnetic particles having a CuAu type or Cu$_3$Au type ferromagnetic ordered alloy phase.

2 Claims, 1 Drawing Sheet

MAGNETIC PARTICLE COATED MATERIAL CONTAINING MAGNETIC PARTICLES HAVING CUAU TYPE OR CU₃AU TYPE FERROMAGNETIC ORDERED ALLOY PHASE, AND METHOD FOR PRODUCING THE SAME

CROSS-REFERENCE TO RELATED APPLICATION

This application claims priority under 35 USC 119 from Japanese Patent Application No. 2003-053285, the disclosure of which is incorporated by reference herein.

BACKGROUND OF THE INVENTION

1. Field of the Invention

The present invention relates to a magnetic particle coated material which can be used in a magnetic recording medium and the like, and a method for producing the same.

2. Description of the Related Art

In order to increase magnetic recording density, it is necessary to decrease the size of magnetic particles included in a magnetic layer of a magnetic recording medium. In magnetic recording media widely used as video tapes, computer tapes, disks, and the like, noise decreases along with decreased particle size when the mass of ferromagnetic bodies is the same.

A CuAu type or $Cu_3Au$ type ferromagnetic ordered alloy is a material for the magnetic particles desirable for increasing magnetic recording density. The ferromagnetic ordered alloy is known to have high crystal magnetic anisotropy because of strain generated at the time of ordering, and exhibits ferromagnetism even when the size of the magnetic particles is decreased.

Magnetic particles having ferromagnetism are produced by a liquid phase method or a vapor phase method. Particularly, magnetic particles immediately after the production thereof by a liquid phase method have a disordered phase and a face-centered cubic lattice structure.

The face-centered cubic lattice generally exhibits soft magnetism or paramagnetism. Magnetic particles having soft magnetism or paramagnetism are not suitable for use in magnetic recording media. In order to obtain a ferromagnetic ordered alloy having a coercive force of at least 95.5 kA/m (i.e., 1200 Oe) required for a magnetic recording medium, it is necessary to carry out annealing at a temperature not lower than a transformation temperature at which the disordered phase is transformed to the ordered phase. (Refer to, for example, U.S. Pat. Nos. 5,456,986, 6,262,129, 6,302,940 and 6,162,532, and Japanese Patent Application Laid-Open (JP-A) Nos. 2001-93130, 2001-256631 and 2002-157727.)

A spin coater is generally used to form a CuAu type or $Cu_3Au$ type magnetic layer on both surfaces of the magnetic recording medium. However, the spin coater cannot form a magnetic layer on one surface of the magnetic recording medium unless the magnetic layer formed on the other surface is dry. Therefore, a method is used in which formation of the magnetic layer on one surface and the other surface of the magnetic recording medium is separately carried out. Namely, first, a material for the magnetic layer is applied onto one surface of a support, and this surface is annealed to form a magnetic layer. Next, the material for the magnetic layer is applied onto the other surface of the support, and this surface is annealed to form a magnetic layer. When annealing is carried out separately to form the magnetic layers, magnetic property of the magnetic layers may vary widely. When the magnetic property widely varies between the magnetic layers, different medium head systems are required so as to correspond to the respective surfaces. Thus, this method is not preferable from practical and industrial standpoints.

Further, in a method in which the material for the magnetic layer is applied onto one surface and subsequently onto the other surface of a support and both the surfaces are annealed at the same time, a drawback arises in that, when the material for the magnetic layer is applied onto the other surface, scratches may be formed on the reverse surface, onto which the material was first applied. Particularly, when the support is formed of an organic material and the magnetic layer is formed by using a spin coater, the support needs to be held on a turn table. Therefore, the aforementioned drawback of scratches becomes significant.

Accordingly, there is a need for a magnetic particle coated material having magnetic layers formed on both surfaces thereof, which magnetic layers have excellent and substantially the same magnetic property (coercive force).

SUMMARY OF THE INVENTION

A first aspect of the present invention is a magnetic particle coated material comprising: a first support having a magnetic layer formed on one surface thereof; and a second support having a magnetic layer formed on one surface thereof, wherein the first support and the second support are attached to each other so that the other surfaces having no magnetic layers formed thereon face each other, and the magnetic layer comprises magnetic particles having a CuAu type or $Cu_3Au$ type ferromagnetic ordered alloy phase.

A second aspect of the present invention is a method for producing a magnetic particle coated material, the method comprising: applying an alloy particle-containing solution onto each of two supports; annealing the supports to form a magnetic layer on one surface of each of the supports, the magnetic layer containing magnetic particles having a CuAu type or $Cu_3Au$ type ferromagnetic ordered alloy phase; and attaching the supports to each other so that the other surfaces having no magnetic layers formed thereon face each other, wherein the supports have substantially the same annealing conditions.

DETAILED DESCRIPTION OF THE INVENTION

Figure 1:
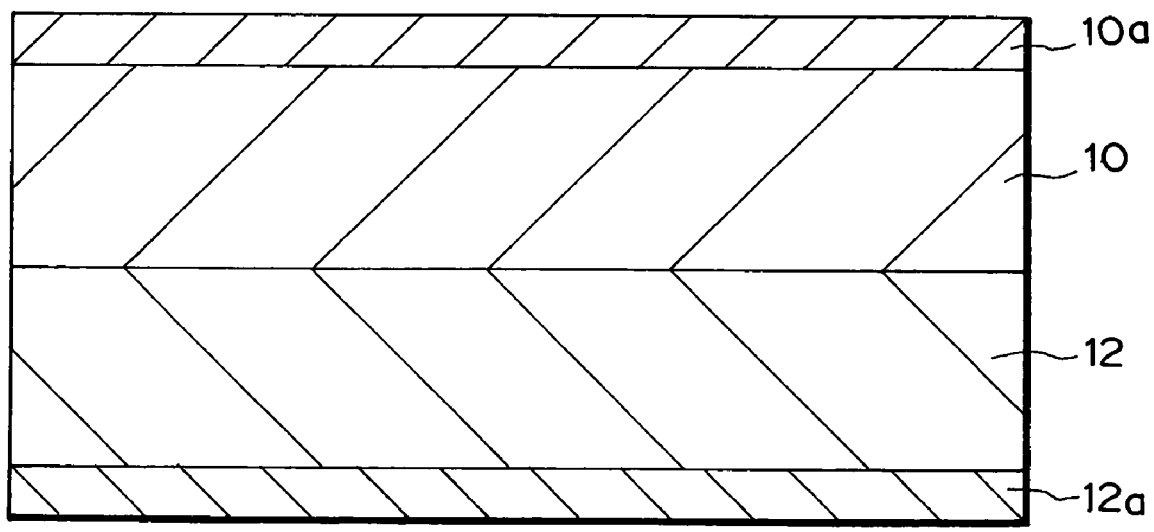
FIG. 1 is a cross-sectional view of a magnetic particle coated material.

A magnetic particle coated material of the present invention will be described first. Further, a method for producing the magnetic particle coated material and a magnetic recording medium using the magnetic particle coated material will be described.

<Magnetic Particle Coated Material>

As shown in FIG. 1, a magnetic particle coated material of the present invention includes a first support 10 having a magnetic layer 10a formed on one surface thereof, and a second support having a magnetic layer 12a formed on one surface thereof. The first support 10 and the second support 12 are attached to each other such that the other surfaces of the supports having no magnetic layers formed thereon face each other.

As described above, with the above structure in which the supports each having the magnetic layer formed thereon in advance are attached to each other, the magnetic layers on the surfaces of the coated material have substantially the same magnetic property. "Substantially the same magnetic property" used herein refers to a state in which the coercive force A of the magnetic layer formed on the first support and the coercive force B of the magnetic layer formed on the second support have a relationship of $0.8 \leq A/B \leq 1.2$ and preferably $0.9 \leq A/B \leq 1.1$. With the magnetic layers having substantially the same magnetic property as described above, the magnetic particle coated material (magnetic recording medium) suitable for practical and industrial use can be produced.

The magnetic property increases mainly after annealing. Therefore, annealing for forming the magnetic layer is preferably carried out on the first and second supports to be attached under substantially the same conditions (and preferably at the same time).

The annealing will be described later.

Magnetic particles having a CuAu type or $Cu_3Au$ type ferromagnetic ordered alloy phase are included in each of the magnetic layers $10a$ and $12a$.

Since these magnetic particles can exhibit ferromagnetism, the magnetic layers containing the magnetic particles therein can obtain excellent magnetic property (i.e., coercive force). The coercive force of the magnetic particles is preferably 95.5 to 398 kA/m (1200 to 5000 Oe), and more preferably 95.5 to 278.6 kA/m (1200 to 3500 Oe) from the viewpoint that a recording head can handle the magnetic particles when they are applied to a magnetic recording medium.

The magnetic particles included in the magnetic layer have a particle diameter of preferably 10 nm or less, and more preferably 3 to 10 nm in order to obtain better magnetic property.

While the thickness of the magnetic layer varies depending on the type of the magnetic recording medium to which the magnetic layer is applied, it is preferably 4 nm to 1 μm and more preferably 4 to 100 nm in order to obtain sufficient electromagnetic transduction characteristics.

Any of inorganic materials and organic materials may be used as the support.

For the support of an inorganic material, Al, a Mg alloy such as an Al—Mg alloy or a Mg—Al—Zn alloy, glass, quartz, carbon, silicon, and ceramics may be used. Supports made of these materials have high impact resistance and also rigidity coping with an improvement in a thinner support and with high speed rotation. These supports are also stronger than organic supports against heat.

For the support of an organic material, polyesters such as polyethylene terephthalate and polyethylene naphthalate, polyolefins, cellulose triacetate, polycarbonates, polyamides (including aliphatic polyamides and aromatic polyamides such as aramide), polyimides, polyamidoimides, polysulfones, and polybenzoxazole may be used.

An adhesive or a pressure sensitive adhesive which will be described below is preferably used to attach the first and second supports to each other.

Further, at least one intermediate support may be interposed between the first and second supports. With this structure, the resulting magnetic disk can have increased rigidity and excellent electromagnetic transduction characteristics.

A material for the intermediate support can be appropriately selected from various materials such as organic materials and inorganic materials and used.

Polycarbonates, polyimides, poetherimides, polyolefins, polyphenylene sulfide, polyacrylates, and polystyrene are preferably used for the intermediate support of an organic material.

Glass, aluminum, and aluminum alloys are preferably used for the intermediate support of an inorganic material.

When plural intermediate supports are provided, they may be formed of the same material or different materials. The adhesive or the pressure sensitive adhesive, which will be described later, can also be used to attach the intermediate supports to each other or to attach the intermediate support and the first or second support to each other.

In view of excellent rigidity and excellent electromagnetic transduction characteristics, the thickness of the intermediate support (the combined thickness when plural intermediate supports are provided) is preferably 0.05 to 5 mm and more preferably 0.07 to 2 mm.

<Method for Producing Magnetic Particle Coated Material>

The magnetic particle coated material is produced by attaching the first support having a magnetic layer formed on one surface thereof and the second support having a magnetic layer formed on one surface thereof to each other at surfaces having no magnetic layers formed thereon.

A method for producing the magnetic particle coated material of the present invention will be described below in detail, including a method for producing magnetic particles.

Method for Producing Magnetic Particles

The magnetic particles included in the magnetic layer of the magnetic particle coated material of the present invention is obtained by annealing alloy particles. First, a method for producing alloy particles and magnetic particles will be described. The alloy particles which can form a ferromagnetic ordered alloy phase are produced by an alloy particle production step in which a liquid phase method or a vapor phase method is used, an oxidation step in which the alloy particles produced are oxidized if necessary, and an annealing step in which the oxidized alloy particles are annealed under a non-oxidizing atmosphere.

Each of the aforementioned steps will be described below.

-Alloy Particle Production Step-

Alloy particles which can be converted to magnetic particles by annealing can be produced by a vapor phase method or a liquid phase method. Considering suitability for mass production, the liquid phase method is preferable. A variety of conventionally known methods can be applied as the liquid phase method. A reduction method, which is an improvement of the conventional method, is preferably employed. Among reduction methods, a reverse micelle method by which the particle size can be easily controlled is particularly preferable.

-Reverse Micelle Method- The reverse micelle method includes at least (1) a reducing step in which a reduction reaction is carried out by mixing two types of reverse micelle solutions, and (2) a maturing step in which the resulting solution is matured at a predetermined temperature after the reducing reaction is completed.

Each of these steps will be described below.

(1) Reducing Step

First, a water-insoluble organic solvent containing a surfactant is mixed with an aqueous reducing agent solution to prepare a reverse micelle solution (I).

An oil-soluble surfactant is used as the surfactant. Specific examples thereof include sulfonates (e.g., Aerosol OT manufactured by Wako Pure Chemical Industries, Ltd.), quaternary ammonium salts (e.g., cetyltrimethylammonium bromide), and ethers (e.g., pentaethylene glycol dodecyl ether).

The amount of the surfactant in the water-insoluble organic solvent is preferably 20 to 200 g/liter.

Preferable examples of the water-insoluble organic solvent dissolving the surfactant include alkanes, ethers, and alcohols.

Alkanes are preferably those having 7 to 12 carbon atoms. Specifically, heptane, octane, isooctane, nonane, decane, undecane and dodecane are preferable.

Ethers are preferably diethyl ether, dipropyl ether, and dibutyl ether.

Alcohols are preferably ethoxyethanol and ethoxypropanol.

As the reducing agent in the aqueous reducing agent solution, alcohols; polyalcohols; $H_2$; HCHO; compounds containing $S_2O_6^{2-}$, $H_2PO_2^-$, $BH_4^-$, $N_2H_5^+$, $H_2PO_3^-$, and the like may be used alone or in combination of two or more.

The amount of the reducing agent in the aqueous solution is 3 to 50 mol based on 1 mol of metal salt.

The mass ratio of water to the surfactant (water/surfactant) in the reverse micelle solution (I) is preferably 20 or less. When the mass ratio exceeds 20, precipitation easily occurs and the particles tend to be uneven. The mass ratio is preferably 15 or less and more preferably 0.5 to 10.

Besides the above micelle solution (I), a reverse micelle solution (II) is prepared by mixing a water-insoluble organic solvent containing a surfactant with an aqueous metal salt solution.

The conditions of the surfactant and the water-insoluble organic solvent (e.g., materials to be used, concentrations, and the like) are the same as those used for the reverse micelle solution (I).

The same solution as, or a solution different from, the reverse micelle solution (I) can be used. Further, the mass ratio range of water to the surfactant in the reverse micelle solution (II) is the same as that in the reverse micelle solution (I), and the mass ratio may be the same as or different from that in the reverse micelle solution (I).

As the metal salt contained in the aqueous metal salt solution, it is preferable to select a proper metal salt such that the magnetic particles to be prepared can form a CuAu type or $Cu_3Au$ type ferromagnetic ordered alloy.

Examples of the CuAu type ferromagnetic ordered alloy include FeNi, FePd, FePt, CoPt, and CoAu. Preferable among these are FePd, FePt, and CoPt.

Examples of the $Cu_3Au$ type ferromagnetic ordered alloy include $Ni_3Fe$, $FePd_3$, $Fe_3Pt$, $FePt_3$, $CoPt_3$, $Ni_3Pt$, $CrPt_3$, and $Ni_3Mn$. Preferable among these are $FePd_3$, $FePt_3$, $CoPt_3$, $Fe_3Pd$, $Fe_3Pt$, and $Co_3Pt$.

Specific examples of the metal salt include $H_2PtCl_6$, $K_2PtCl_4$, $Pt(CH_3COCHCOCH_3)_2$, $Na_2PdCl_4$, $Pd(OCOCH_3)_2$, $PdCl_2$, $Pd(CH_3COCHCOCH_3)_2$, $HAuCl_4$, $Fe_2(SO_4)_3$, $Fe(NO_3)_3$, $(NH_4)_3Fe(C_2O_4)_3$, $Fe(CH_3COCHCOCH_3)_3$, $NiSO_4$, $CoCl_2$, and $Co(OCOCH_3)_2$.

The concentration of the aqueous metal salt solution (as the metal salt concentration) is preferably 0.1 to 1000 µmol/ml and more preferably 1 to 100 µmol/ml.

By appropriately selecting the metal salt, alloy particles capable of forming the CuAu type or $Cu_3Au$ type ferromagnetic ordered alloy in which a base metal and a noble metal are alloyed are produced.

The alloy phase of the alloy particles needs to be transformed from the disordered phase to the ordered phase by annealing the alloy particles, which will be described later.

In order to lower the transformation temperature, it is preferable to add a third element such as Sb, Pb, Bi, Cu, Ag, Zn, and In to the foregoing binary alloys. Precursors of the respective third elements are preferably added to the metal salt solution in advance. The addition amount is preferably 1 to 30 at %, and more preferably 5 to 20 at %, based on the binary alloys.

The reverse micelle solutions (I) and (II) prepared as described above are mixed. Although the mixing method is not particularly limited, in view of uniformity of reduction, mixing is preferably carried out by adding the reverse micelle solution (II) while stirring the reverse micelle solution (I). A reduction reaction is conducted on completion of the mixing. The temperature during the reduction is preferably constant within a range of −5 to 30° C.

When the reduction temperature is less than −5° C., a problem arises in that the aqueous phase freezes, thereby resulting in an uneven reduction reaction. When the reduction temperature exceeds 30° C., flocculation or precipitation easily occurs, thereby making the system unstable. The reduction temperature is preferably 0 to 25° C. and more preferably 5 to 25° C.

The foregoing term "constant temperature" means that, when the preset temperature is T(° C.), the real temperature falls in a range of T±3° C. The upper limit and the lower limit of the real reduction temperature are still within the above-mentioned range of the temperature (−5 to 30° C.).

Although the duration of the reduction should be properly set depending on the amounts or the like of the reverse micelle solutions, the duration is preferably 1 to 30 minutes and more preferably 5 to 20 minutes.

Since the reduction greatly affects monodispersibility of the particle diameter distribution, it is preferable to carry out the reduction with stirring at a rate as high as possible.

A preferable stirring apparatus is a stirring apparatus having high shearing force, and is specifically a stirring apparatus in which the stirring blade basically has a turbine type or paddle type structure, a sharp edge is attached to the end of the blade or a position where it is in contact with the blade, and the blade is rotated by a motor. Specifically, Dissolver (manufactured by Tokushu Kika Kogyo Co., Ltd.), Omnimixer (manufactured by Yamato Scientific Co., Ltd.), Homogenizer (manufactured by SMT), and the like are useful. By using each of these apparatuses, monodisperse alloy particles can be synthesized in the form of a stable dispersion liquid.

It is preferable to add at least one dispersant having 1 to 3 amino groups or carboxyl groups to at least one of the above reverse micelle solutions (I) and (II) in an amount of 0.001 to 10 mol per mol of the alloy particles to be produced.

Addition of such a dispersant makes it possible to obtain alloy particles with improved monodispersibility and which are free from flocculation.

When the amount of the dispersant is less than 0.001 mol, the monodispersibility of the alloy particles may not be improved. When the amount of the dispersant exceeds 10 mol, flocculation may occur.

As the aforementioned dispersant, an organic compound having a group adhering to the surface of the alloy particle is preferable. Specific examples of the dispersant include organic compounds having 1 to 3 amino groups, carboxy groups, sulfonic acid groups or sulfinic acid groups. These organic compounds may be used alone or in combination of two or more.

The compound has a structural formula represented by R—$NH_2$, $NH_2$—R—$NH_2$, $NH_2$—R($NH_2$)—$NH_2$, R—COOH, COOH—R—COOH, COOH—R(COOH)—

COOH, R—SO₃H, SO₃H—R—SO₃H, SO₃H—R(SO₃H)—SO₃H, R—SO₂H, SO₂H—R—SO₂H, or SO₂H—R(SO₂H)—SO₂H, wherein R is a linear, branched or cyclic saturated or unsaturated hydrocarbon.

A compound particularly preferable as the dispersant is oleic acid. Oleic acid is a surfactant well known for stabilizing colloids and has been used to protect metal particles of iron or the like. Oleic acid has a relatively long chain (for example, oleic acid has a chain of 18 carbons with a length of up to 20 Å (about 2 nm) and is not an aliphatic compound but has one double bond) which gives important steric hindrance canceling a strong magnetic interaction between particles.

In the same way as in the case of oleic acid, similar long-chain carboxylic acids such as erucic acid and linoleic acid are used. (For example, long-chain organic acids having 8 to 22 carbon atoms may be used alone or in combination of two or more.) Oleic acid (e.g., olive oil) is preferable because it is an easily available and inexpensive natural resource. As well as oleic acid, oleylamine derived from oleic acid is also a useful dispersant.

In the above reduction, it is considered that a metal with a lower redox potential (metal with a redox potential of about −0.2 V (vs. N.H.E) or less) such as Co, Fe, Ni, Cr, or the like in the CuAu type or Cu₃Au type ferromagnetic ordered alloy phase is reduced and precipitates in a micro-sized and monodisperse state. Thereafter, in a heating stage and in a maturing step which will be described later, the base metal which has precipitated becomes a core and, on the surface thereof, a metal with a higher redox potential (metal with a redox potential of about 0.2 V (vs. N.H.E) or more) such as Pt, Pd, Rh, or the like is reduced by the base metal and precipitates, thereby replacing the base metal. The ionized base metal is considered to be reduced again by a reducing agent and precipitates. Such a process is repeated to obtain an alloy particle capable of forming the CuAu type or Cu₃Au type ferromagnetic ordered alloy.

(2) Maturing Step

On completion of the reduction reaction, the solution after the reaction is heated to a maturing temperature.

The maturing temperature is preferably set to a constant temperature, which is higher than the temperature in the reduction reaction and is in a range of 30 to 90° C. The maturing time is preferably 5 to 180 minutes. When the maturing temperature is higher than the above range or the maturing time is longer than the above range, flocculation or precipitation easily occurs. On the contrary, when the temperature is lower than the above range or the time is shorter than the above range, the reaction may not be completed, leading to a change in the composition of the alloy. The maturing temperature is preferably 40 to 80° C. and more preferably 40 to 70° C. The maturing time is preferably 10 to 150 minutes and more preferably 20 to 120 minutes.

The aforementioned term "constant temperature" has the same meaning as in the case of the temperature in the reduction reaction (provided that the "reducing temperature" is changed to the "maturing temperature"). Particularly, the maturing temperature is higher than the aforementioned temperature used in the reduction reaction by preferably 5° C. or more, and more preferably 10° C. or more within the aforementioned maturing temperature range (30 to 90° C.). When the difference between the reduction temperature and the maturing temperature is less than 5° C., a composition according to the formulation may not be obtained.

In the aforementioned maturing step, a precious metal precipitates on the base metal which has been reduced and has precipitated in the reducing step.

Namely, the precious metal is reduced only on the base metal, and therefore, the base metal and the precious metal do not precipitate separately. Thus, alloy particles which can efficiently form the CuAu type or Cu₃Au type ferromagnetic ordered alloy can be produced in a high yield according to the formulated composition ratio, and the composition of the alloy particles can be controlled as desired. Further, the diameter of the resulting alloy particles can be controlled as desired by appropriately adjusting stirring speed at the temperature during the maturing step.

After the above maturing, washing and dispersing steps are preferably carried out, in which the solution after the maturing is washed with a mixed solution of water and primary alcohol and then precipitation treatment is carried out using primary alcohol to produce a precipitate, which is then dispersed in an organic solvent.

Impurities are removed by carrying out the washing and dispersing steps, thereby improving the coating property at the time of forming a magnetic layer of the magnetic recording medium by coating.

The above washing and dispersion are respectively carried out at least once and preferably twice.

Although there is no particular limitation to the aforementioned primary alcohol used in the washing step, methanol, ethanol, or the like is preferable. The mixing ratio by volume (water/primary alcohol) is preferably in a range of 10/1 to 2/1 and more preferably in a range of 5/1 to 3/1.

If the ratio of water is high, it may be difficult to remove the surfactant. On the contrary, if the ratio of the primary alcohol is high, flocculation may occur.

The alloy particles dispersed in the solution (i.e., alloy particle-containing solution) are obtained in the above manner.

Since the alloy particles have monodisperse distribution, even when these particles are applied onto a support, they do not flocculate but remain in a uniformly dispersed state. These alloy particles do not flocculate even when annealing treatment is carried out, and ferromagnetism can be efficiently imparted to the alloy particles, and the alloy particles have excellent coating property.

The diameter of the alloy particles before oxidation, which will be described later, is preferably small in order to reduce noise. If the diameter is too small, the particles may become superparamagnetic after annealing, which is unsuitable for use in magnetic recording. Generally, the diameter of the alloy particle is preferably 10 nm or less, and more preferably 3 to 10 nm.

Reduction Method

There are a variety of methods for producing the alloy particles that can form the above-described CuAu type or Cu₃Au type ferromagnetic ordered alloy. A method is preferable in which a metal with a lower redox potential (which may simply be referred to as a "base metal" hereinafter) and a metal with a higher redox potential (which may simply be referred to as a "precious metal" hereinafter) are reduced with a reducing agent or the like in an organic solvent, water, or a mixed solution of an organic solvent and water.

The sequence of the reduction of the base metal and the precious metal is not particularly limited, and both may be reduced simultaneously.

As the organic solvent, alcohol, polyalcohol, or the like can be used. Examples of the alcohol include methanol, ethanol, and butanol, and examples of the polyalcohol include ethylene glycol, and glycerin.

Examples of the CuAu type or $Cu_3Au$ type ferromagnetic ordered alloy are the same as those exemplified in the above-described reverse micelle method.

Further, a method disclosed in paragraphs 18 to 30 in JP-A No. 2003-73705 can be applied as a method for producing alloy particles by precipitating the precious metal before the base metal.

Pt, Pd, or Rh is preferably used as the metal with a higher redox potential, and $H_2PtCl_6.6H_2O$, $Pt(CH_3COCHCOCH_3)_2$, $RhCl_3.3H_2O$, $Pd(OCOCH_3)_2$, $PdCl_2$, $Pd(CH_3COCHCOCH_3)_2$, or the like can be used in the form of a solution. The concentration of the metal in the solution is preferably 0.1 to 1000 µmol/ml and more preferably 0.1 to 100 µmol/ml.

Co, Fe, Ni, or Cr is preferably used as the metal with a lower redox potential, and Fe and Co are particularly preferable. These metals can be used by dissolving $FeSO_4.7H_2O$, $NiSO_4.7H_2O$, $CoCl_2.6H_2O$, $Co(OCOCH_3)_2.4H_2O$, or the like in a solvent. The concentration of the metal in a solution is preferably 0.1 to 1000 µmol/ml and more preferably 0.1 to 100 µmol/ml.

Similarly to the above-described reverse micelle method, the transformation temperature to the ferromagnetic ordered alloy is preferably lowered by adding a third element to a binary alloy. The addition amount is the same as that in the case of the reverse micelle method.

For example, when a base metal and a precious metal are reduced and precipitated in this order by using a reducing agent, the reduction is preferably carried out as follows: the base material or the base metal and a part of a precious metal are reduced with a reducing agent having a reduction potential lower than −0.2 V (vs. N.H.E), the resultant reaction system is added to a precious metal source, the precious metal is reduced with a reducing agent having a redox potential higher than −0.2 V (vs. N.H.E), and thereafter, the base metal is reduced with a reducing agent having a reduction potential lower than −0.2 V (vs. N.H.E).

Although the redox potential varies depending on the pH of a system, as the reducing agent with a redox potential higher than −0.2 V (vs. N.H.E), alcohols such as 1,2-hexadecanediol, glycerins, $H_2$, and HCHO are preferably used.

$S_2O_6^{2-}$, $H_2PO_2^-$, $BH_4^-$, $N_2H_5^+$, and $H_2PO_3^-$ are preferably used as the reducing agent with a redox potential lower than −0.2 V (vs. N.H.E).

No reducing agent is particularly required when a zero-valent metal compound such as Fe carbonyl is used as a raw material of the base metal.

The alloy particles can be stably produced in the presence of an adsorbent at the time of reducing and precipitating the precious metal. A polymer or a surfactant is preferably used as the adsorbent.

Examples of the polymer include polyvinyl alcohol (PVA), poly-N-vinyl-2-pyrrolidone (PVP), and gelatin. PVP is particularly preferable.

The molecular weight of the polymer is preferably 20,000 to 60,000 and more preferably 30,000 to 50,000. The amount of the polymer is preferably 0.1 to 10 times and more preferably 0.1 to 5 times the mass of the alloy particles to be produced.

The surfactant preferably used as the adsorbent preferably contains an "organic stabilizer", which is a long chain organic compound represented by a formula R—X. In the formula, R represents a "tail group", which is a linear or branched hydrocarbon or fluorocarbon chain and generally contains 8 to 22 carbon atoms. X represents a "head group", which is a portion (X) providing a specific chemical bond to the surface of the alloy particle and is preferably any one of sulfinate (—SOOH), sulfonate (—$SO_2OH$), phosphinate (—POOH), phosphonate (—OPO$(OH)_2$), carboxylate, and thiol.

The organic stabilizer is preferably any one of sulfonic acid (R—$SO_2OH$), sulfinic acid (R—SOOH), phosphinic acid ($R_2$POOH), phosphonic acid (R—OPO$(OH)_2$), carboxylic acid (R—COOH), and thiol (R—SH). Similarly to the reverse micelle method, oleic acid is particularly preferable among them.

The combination of the phosphine and the organic stabilizer (e.g., a combination of triorganophosphine and acid) can provide excellent controlling ability for the growth and stabilization of the particles. While didecyl ether and didodecyl ether can be used, phenyl ether or n-octyl ether is preferably used as a solvent because of its low cost and high boiling point.

The reaction is carried out at a temperature of 80 to 360° C. and more preferably 80 to 240° C., depending on the desired alloy particles and the boiling point of the solvent. The particles may not grow if the temperature is lower than the range. If the temperature is higher than the range, the particles may grow without control, thereby increasing the amount of undesirable by-products.

Similarly to that in the reverse micelle method, the particle diameter of the alloy particle is preferably 10 nm or less and more preferably 3 to 10 nm.

A seed crystal method is effective as a method for increasing the particle size (particle diameter). When the alloy particles are used in a magnetic recording medium, it is preferable to achieve close-packing of the alloy particles in order to increase the recording capacity. For that purpose, the standard deviation of the size of the alloy particles is preferably less than 10%, and more preferably 5% or less.

When the particle size is too small, the alloy particles become superparamagnetic, which is not preferable. In order to increase the particle size, as described above, the seed crystal method is preferably used. In this method, a metal having a redox potential higher than that of the metal forming the particles may precipitate, leading to oxidation of the particles. Therefore, the particles are preferably subjected to hydrogenation treatment in advance.

The outermost layer of the alloy particle is preferably formed by a precious metal from the standpoint of preventing oxidation. However, the particles having such a structure easily flocculate. Therefore, according to the present invention, the outermost layer of the particle is preferably formed by an alloy of a precious metal and a base metal. Such a structure can be easily and efficiently formed by the liquid phase method.

Removal of salts from the solution after the production of the alloy particles is preferable in terms of improvement in the dispersion stability of the alloy particles. In order to remove the salts, alcohol is excessively added to cause slight flocculation, which allows spontaneous or centrifugal precipitation such that the salts are removed together with a supernatant. However, since flocculation is easily formed in such a method, an ultrafiltration method is preferably used.

Thus, the alloy particles which are dispersed in a solution (alloy particle-containing solution) are obtained.

A transmission electron microscope (TEM) may be used in the measurement of the particle diameter of the alloy particles. Although electronic diffraction by the TEM can be used to determine the crystal system of the alloy particles or magnetic particles, it is preferable to use x-ray diffraction because of its high accuracy. In order to analyze the composition of the inside of the alloy particle or magnetic particle, an FE-TEM capable of finely focusing electron beams is preferably used together with an EDAX. A VSM can be used to evaluate the magnetic property of the alloy particles or magnetic particles.

-Oxidation Step-

By oxidizing thus-obtained alloy particles, magnetic particles having ferromagnetism can be efficiently produced without increasing the temperature during the subsequent annealing in a non-oxidizing atmosphere. This is considered to be due to the phenomenon described as follows.

Namely, at first, oxygen enters a crystal lattice by oxidizing the alloy particle. When the alloy particle is annealed at this state, oxygen is dissociated from the crystal lattice by the heat. Defects are caused by the dissociation of oxygen. Since the metal atoms forming the alloy can easily move through the defects, phase transformation is easily caused even at a relatively low temperature.

Such a phenomenon is supported by measuring the EXAFS (expanded X-ray absorption fine structure) of the alloy particle after the oxidation and the magnetic particle after the annealing.

For example, in a Fe—Pt alloy particle which is not oxidized, a bond between Fe atoms or between a Pt atom and a Fe atom can be confirmed.

On the contrary, in an alloy particle which has been oxidized, a bond between a Fe atom and an oxygen atom can be confirmed. However, bonds between Fe atoms and between a Pt atom and a Fe atom are scarcely observed. This means that the bonds of Fe—Pt and Fe—Fe are cut by oxygen atoms. For this reason, it is considered that Pt atoms and Fe atoms easily move during annealing.

After the alloy particle is annealed, the presence of oxygen cannot be confirmed, and the presence of bonds between Fe atoms and between a Pt atom and a Fe atom can be confirmed.

Considering the above phenomenon, it can be understood that, without oxidation, the phase transformation is difficult to proceed and the annealing temperature needs to be high. However, if oxidation is carried out excessively, the interaction between oxygen and a metal which is easily oxidized such as Fe becomes so intense that a metal oxide is produced.

Thus, control of the oxidation state of the alloy particles is important, and for this purpose, optimum oxidation conditions need to be set.

When the alloy particles are produced by the liquid phase method described above, the oxidation can be carried out by supplying at least gas containing oxygen to the produced alloy particle-containing solution.

The partial pressure of the oxygen is preferably 10 to 100%, and more preferably 15 to 50%, of the total pressure.

The oxidation temperature is preferably 0 to 100° C. and more preferably 15 to 80° C.

The oxidation state of the alloy particles is preferably evaluated by the EXAFS and the like. The number of bonds of a base metal such as Fe with oxygen is preferably 0.5 to 4 and more preferably 1 to 3 from the viewpoint of oxygen cutting the Fe—Fe bonds and Pt—Fe bonds.

As described above, the alloy particles thus produced are dispersed in the solution. Since the oxidized alloy particles have a disordered phase, the particles cannot attain ferromagnetism. Therefore, in order to transform the disordered phase to the ordered phase, heating treatment (annealing), which will be described below, needs to be carried out.

-Annealing-

Annealing is preferably carried out on a support. Namely, it is preferable that the alloy particle-containing solution is applied onto one surface of the support and the surface is annealed. Further, it is preferable that a pair of supports to be attached to each other are annealed in one apparatus. In this way, annealing can be carried out simultaneously under substantially the same conditions. As a result, the magnetic property of both surfaces can be made substantially the same.

If the alloy is annealed in the state of particles, the particles easily move to cause fusion. Therefore, although high coercive force can be obtained, the resultant magnetic recording medium tends to have a drawback of its large particle size. Accordingly, the alloy particles are preferably annealed while being applied onto a support in order to prevent flocculation of the alloy particles.

Further, by annealing the alloy particles on the support to form magnetic particles, a magnetic recording medium including a magnetic layer formed by the magnetic particles can be obtained.

The transformation temperature, at which the phase of the alloy forming the alloy particles transforms from the disordered phase to the ordered phase, can be obtained by using a differential thermal analyzer (DTA). Annealing needs to be carried out at a temperature equal to or higher than the transformation temperature.

Although the transformation temperature is generally about 500° C., it may decrease by adding a third element. Thus, the annealing temperature is preferably 150° C. or more, and more preferably 150 to 500° C.

In order to apply the alloy particles on the support, various additives are added, if necessary, to the alloy particle-containing solution after the oxidation, and the mixture is applied onto the support.

The content of the alloy particles is preferably 0.01 to 0.1 mg/ml in order to obtain a desired concentration.

As a method for applying the alloy particles onto the support, air doctor coating, blade coating, rod coating, extrusion coating, air knife coating, squeeze coating, impregnation coating, reverse roll coating, transfer roll coating, gravure coating, kiss coating, cast coating, spray coating, spin coating, or the like can be used.

The atmosphere during annealing is a non-oxidizing atmosphere such as $H_2$, $N_2$, Ar, He, Ne, or the like in order to efficiently promote the phase transformation and prevent oxidation of the alloy.

Particularly, in terms of dissociation of oxygen which has entered the lattice by oxidation, the atmosphere is preferably a reducing atmosphere such as methane, ethane, $H_2$, or the like. Further, in order to retain the particle diameter, annealing is preferably carried out in a magnetic field under the reducing atmosphere. When annealing is carried out under $H_2$ atmosphere, an inert gas is mixed for explosion-protection.

Further, in order to prevent fusion of the particles during annealing, it is preferable to carry out annealing once at a temperature equal to or lower than the transformation temperature under an inert gas to carbonize the dispersant, and then carry out annealing at a temperature equal to or higher than the transformation temperature in a reducing atmosphere. In this case, it is most preferable that, after the above annealing is carried out at a temperature equal to or lower than the transformation temperature, if necessary, a silicon-containing resin is applied onto the layer of the alloy particles and then annealing is carried out at a temperature equal to or higher than the transformation temperature.

By carrying out such annealing as described above, the phase of the alloy particles is transformed from the disordered phase to the ordered phase, whereby magnetic particles having ferromagnetism are produced. Since the magnetic particles are present on the support, a layer containing the magnetic particles is formed on the support by the annealing.

Method for Producing Magnetic Particle Coated Material

The pair of supports (i.e., supports (1) and (2)) thus obtained are attached to each other by an adhesive or a pressure sensitive adhesive such that the surfaces of the supports having no magnetic layers formed thereon face each other. In this way, a magnetic particle coated material of the present invention is formed.

The sequence in which the alloy particle-containing solution is applied onto supports (1) and (2) (which may collectively be referred to as the "supports" hereinafter), and the supports are annealed and attached to each other will be described below. Any of the following sequences 1 to 3 is preferably used.

1. The support is cut into disks; the alloy particle-containing solution is applied onto one surface of each of the disks; the disks are annealed; and the disks are attached to each other.
2. The alloy particle-containing solution is applied onto one surface of the support; the support is annealed; the support is cut into disks; and the disks are attached to each other.
3. The alloy particle-containing solution is applied onto one surface of each of the supports; the supports are annealed; the supports are attached to each other; and the attached supports are cut into disks.

The above sequences 2 and 3 are preferable to enable continuous production.

While an attaching method is not particularly limited, (1) a method in which a UV curable resin or a thermosetting resin is used, (2) a method in which a cationic UV curable resin is used, (3) a method in which a double-sided adhesive tape is used, (4) a method in which a hot-melt adhesive is used, or (5) a method in which a two-part curable adhesive is used can be applied.

These methods will be described below.

(1) Method in which a UV Curable Resin or Thermosetting Resin is Used

In this method, first, a liquid adhesive is applied onto one of a pair of disk-shaped supports each having a magnetic layer formed on one surface. The liquid adhesive is applied onto a surface opposite to the surface having the magnetic layer formed thereon. Thereafter, the other support is placed on the one support such that the surface of the other support on which no magnetic layer is formed contacts the adhesive-coated surface of the one support.

In this state, the pair of supports are rotated in an in-plane direction. The adhesive spreads between the supports due to a centrifugal force and finally reaches outer peripheral portions of the supports. By the adhesive being cured so as to have a predetermined thickness, the supports are attached to each other, and an adhesive layer is formed between the supports.

By controlling the number and time of revolution, excessive adhesive can be removed, and the adhesive layer having a desired thickness can be formed.

When a UV curable resin is used as the adhesive, the attached supports are preferably placed under a light source emitting ultraviolet rays. Further, when a thermosetting resin is used as the adhesive, the attached supports are preferably placed in an oven heated to a predetermined temperature or higher.

The UV curable resin or the thermosetting resin cures or sets completely by irradiating the attached supports with the ultraviolet rays, or by placing the supports into an oven. As a result, the pair of supports are completely attached to each other.

(2) Method in which a Cationic UV Curable Resin is Used

In this method, a pair of supports are attached to each other in the same way as in the above method (1) except that a cationic UV curable resin is used.

An adhesive formed of a cationic UV curable resin gradually cures after being irradiated with energy lines. Accordingly, in this case, coating the support with the adhesive and attaching the supports to each other do not need to be carried out simultaneously.

(3) Method in which a Double-Sided Adhesive Tape is Used

In this method, one adhesive surface of a double-sided adhesive tape is attached to one support, and subsequently, the other adhesive surface of the tape is attached to the other support.

A variety of generally used adhesives such as rubber adhesives, acrylic adhesives, vinyl adhesives, and silicone adhesives are used for adhesive layers.

(4) Method in which a Hot-Melt Adhesive is Used

In this method, a pair of supports are attached to each other by using a hot-melt adhesive.

The hot-melt adhesive is an adhesive mainly formed of a base polymer, a tackifier, wax, and the like.

Any base polymer may be used as the base polymer as long as it exhibits tackiness at room temperature. Examples of the base polymer include an EVA polymer which is a copolymer of ethylene and vinyl acetate, a polyamide polymer formed by condensation polymerization of dimer acid and diamine, a polyester polymer formed by copolymerization of terephthalic acid and ethylene glycol, and a thermoplastic rubber polymer mainly formed by a SIS copolymer or a SBS block copolymer.

Examples of the tackifier include rosin, rosin derivatives, pinene resin, phenol resin, petroleum resin, and the like.

Examples of the wax include paraffin wax, microcrystalline wax, low molecular weight polyethylene wax, and the like.

In addition to the aforementioned components, additives such as a plasticizer and a filler may be added to the hot-melt adhesive, if necessary.

The method will be described in detail. First, the hot-melt adhesive is applied by a spin coater or the like onto at least one support (on a surface having no magnetic layer formed thereon) and spread in a radial direction to form a coating film of the hot-melt adhesive.

Subsequently, a surface of the other support opposite to the surface having a magnetic layer formed thereon is attached to the coating film of the hot-melt adhesive. The surface of the other support may have a coating layer of the hot-melt adhesive formed thereon.

The pair of supports are preferably pressed against each other at a predetermined pressure.

Since a liquid adhesive is not used in this method, the pair of supports can be easily attached to each other. Further, in this method, a magnetic particle coated material having excellent surface property can be produced by pressing the pair of supports at a predetermined pressure when they are attached to each other.

In this method, the hot-melt adhesive may be applied onto the support by using, for example, a roll coating method, instead of using a spin coater.

The thickness of the adhesive layer formed of the hot-melt adhesive is preferably 1 to 100 µm.

(5) Method in which a Two-Part Adhesive is Used

A two-part curable adhesive is an adhesive which is mainly formed of a main agent and a sub agent, and starts setting by mixing the main agent with the sub agent.

Examples of the two-part curable adhesive include epoxy adhesives, second-generation acrylic (SGA) adhesives, polyurethane adhesives, silicone adhesives, and the like.

In addition to the main agent and the sub agent, a crosslinking accelerator, a curing catalyst, and the like may be added to the two-part curable adhesive as additives.

In this method, first, the main agent is applied onto a surface of one support having no magnetic layer formed thereon, and the sub agent is applied onto a surface of the other support having no magnetic layer formed thereon. Subsequently, the pair of supports are pressed against each other at a predetermined pressure and joined such that the surfaces having no magnetic layers formed thereon face each other, whereby a magnetic particle coated material is obtained.

In this method, a curing reaction proceeds once the main agent applied onto the one support and the sub agent applied onto the other support are mixed. The two-part curable adhesive completely cures after a predetermined period of time to form a magnetic particle coated material. Thus, the two-part curable adhesive has advantages in that it has excellent working property and long pot life.

When the two-part curable adhesive is used, additives such as a crosslinking accelerator and a curing catalyst may be included in either the main agent or the sub agent.

It is preferable that an appropriate attaching method is selected from the above methods in view of productivity and the like. Among the above methods, however, method (1) or (2) in which the UV curable resin or the thermosetting resin is used is preferable over method (3) in which the double-sided adhesive tape is used, since method (1) or (2) provides higher film strength.

<Magnetic Recording Medium>

The magnetic particle coated material of the present invention is preferably used in a magnetic recording medium. Examples thereof include magnetic tapes such as a video tape and a computer tape; and magnetic disks such as a flexible disk and a hard disk.

The magnetic recording medium may have other layer, if necessary, in addition to the magnetic layer.

Further, wear resistance can be improved by forming an extremely thin protection film on the magnetic layer, and slip characteristics can be improved by applying a lubricant onto the protection film, whereby a magnetic recording medium having sufficiently high reliability can be obtained.

Examples of a material for the protection film include oxides such as silica, alumina, titania, zirconia, cobalt oxide, nickel oxide, and the like; nitrides such as titanium nitride, silicon nitride, boron nitride, and the like; carbides such as silicon carbide, chromium carbide, boron carbide, and the like; and carbon such as graphite, amorphous carbon, and the like. Generally, hard amorphous carbon called diamond-like carbon is particularly preferable.

The protection film of carbon is an extremely thin film having sufficient wear resistance and rarely causes seizing in a sliding member, and is thus suitable as a material for the protection film.

As a method for forming the carbon protection film, sputtering is generally used in the case of a hard disk, and a number of methods using plasma CVD with a higher film formation rate have been proposed for products such as video tapes and the like which require continuous film formation. Accordingly, these methods are preferably used.

It has been reported that, among these methods, a plasma injection CVD (PI-CVD) method has an extremely high film formation rate and can provide an excellent carbon protection film which is hard and has few pin holes (e.g., JP-A Nos. 61-130487, 63-279426 and 3-113824).

The carbon protection film preferably has Vickers hardness of 1000 $kg/mm^2$ or more, and more preferably 2000 $kg/mm^2$ or more. Further, the carbon protection film preferably has an amorphous crystal structure and is preferably non-conductive.

When the diamond-like carbon is used as the carbon protection film, the structure thereof can be confirmed by Raman spectroscopic analysis. Namely, when the spectra of the diamond-like carbon film are measured, the structure thereof can be confirmed by detecting a peak at 1520 to 1560 $cm^{-1}$. If the structure of the carbon film is shifted from the diamond-like structure, the peak detected by the Raman spectroscopic analysis is shifted from the foregoing range, and hardness of the protection film decreases.

As a raw material of the carbon for forming the carbon protection film, carbon-containing compounds, for example, alkanes such as methane, ethane, propane, butane, and the like; alkenes such as ethylene, propylene, and the like; alkynes such as acetylene and the like are preferably used. Further, if necessary, a carrier gas such as argon or a gas such as hydrogen, nitrogen, and the like for improving the film quality may be added.

When the carbon protection film is thick, electromagnetic transduction characteristics deteriorate, and adhesion thereof to the magnetic layer decreases. When the carbon protection film is thin, wear resistance becomes insufficient. Thus, the film thickness is preferably 2.5 to 20 nm and more preferably 5 to 10 nm.

In order to improve the adhesion between the protection film and the magnetic layer which serves as a substrate, it is preferable to etch the surface of the magnetic layer previously with an inert gas or to modify the magnetic layer surface by exposing the surface to a reactive gas plasma such as oxygen.

The magnetic layer may be formed so as to have a layered structure in order to improve the electromagnetic transduction characteristics, or may have a known non-magnetic under layer and an intermediate layer thereunder. In order to improve running durability and corrosion resistance, as described above, a lubricant or a rust-preventive agent is preferably applied onto the magnetic layer or the protection film. As the lubricant to be added, known hydrocarbon lubricants, fluorine-containing lubricants, and extreme pressure additives, and the like can be used.

Examples of the hydrocarbon lubricants include carboxylic acids such as stearic acid, oleic acid, and the like; esters such as butyl stearate and the like; sulfonic acids such as octadecylsulfonic acid; phosphates such as monooctadecyl phosphate; alcohols such as stearyl alcohol, oleyl alcohol, and the like; carboxylic amides such as stearic acid amide; and amines such as stearylamine and the like.

Examples of the fluorine-containing lubricants include lubricants obtained by substituting some or all of the alkyl groups of the above hydrocarbon lubricants with fluoroalkyl groups or perfluoropolyether groups.

Examples of the perfluoropolyether groups include perfluoromethylene oxide polymers, perfluoroethylene oxide polymers, perfluoro-n-propylene oxide polymers $(CF_2CF_2CF_2O)_n$, perfluoroisopropylene oxide polymers (CF $(CF_3)CF_2O)_n$, or copolymers thereof.

Further, compounds which are hydrocarbon lubricants having a polar functional group such as a hydroxyl group, an ester group, a carboxyl group and the like at the terminal of the alkyl group and in the molecules are effective in decreasing frictional force and are therefore suitable.

The molecular weight thereof is 500 to 5,000 and preferably 1,000 to 3,000. When the molecular weight is less than 500, volatility may become high and lubricating property may become low. Further, when the molecular weight exceeds 5,000, viscosity becomes high, whereby a slider and a disk may easily stick to each other and cause running stoppage or head crash.

As the perfluoropolyethers, those in the trade names of Fomblin manufactured by Audimont K.K., Krytox manufactured by Du Pont K.K., and the like are commercially available.

Examples of the extreme pressure additives include phosphoric acid esters such as trilauryl phosphate; phosphorous acid esters such as trilauryl phosphite; thiophosphorous acid esters such as trilauryl trithiophosphite, thiophosphoric acid esters, and the like; and sulfur-containing extreme pressure agents such as dibenzyl disulfide and the like.

The lubricants can be used alone or in combination of a plurality thereof. The methods for applying the lubricant onto the magnetic layer or the protection film may involve steps of dissolving such a lubricant in an organic solvent and applying the solution onto the layer or the film by a wire bar, gravure coating, spin coating, or dip coating, or depositing the lubricant on the layer or film by vacuum evaporation.

Examples of the rust-preventive agents include nitrogen-containing heterocyclic compounds such as benzotriazole, benzimidazole, purine, pyrimidine, and the like, and derivaties thereof obtained by introducing alkyl side chains into the mother cores of these compounds; nitrogen-and sulfur-containing heterocyclic compounds such as benzothiazole, 2-mercaptobenzothiazole, tetrazaindene cyclic compounds, thiouracyl compounds, and the like, and derivatives thereof.

The magnetic recording medium produced as described above has a center line average height of the surface in a range of preferably 0.1 to 5 nm and more preferably 1 to 4 nm, with a cut-off value of 0.25. With the center line average height in the above range, the magnetic recording medium has a surface of extremely excellent smoothness, which is preferable for the magnetic recording medium for high density recording.

An example of a method for obtaining such a surface is a method in which calendering treatment is carried out after the magnetic layer is formed. Alternatively, varnishing treatment may be carried out.

The obtained magnetic recording medium may be properly punched out by a punching machine, or cut into a desired size by a cutting machine or the like and used.

EXAMPLES

The present invention will now be described by, but is not limited to, the following Examples.

Production of FePt Alloy Particles

The following operations were carried out in high purity $N_2$ gas.

An alkane solution obtained by mixing 10.8 g of Aerosol OT (produced by Wako Pure Chemical Industries, Ltd.), 80 ml of decane (produced by Wako Pure Chemical Industries, Ltd.), and 2 ml of oleylamine (produced by Tokyo Kasei Kogyo Co., Ltd.) was added to and mixed with an aqueous reducing agent solution obtained by dissolving 0.76 g of $NaBH_4$ (produced by Wako Pure Chemical Industries, Ltd.) in 16 ml of water (deoxidation: 0.1 ml/liter or less) to prepare a reverse micelle solution (I).

An alkane solution obtained by mixing 5.4 g of Aerosol OT and 40 ml of decane was added to and mixed with an aqueous metal salt solution obtained by dissolving 0.46 g of iron triammonium trioxalate $(Fe(NH_4)_3(C_2O_4)_3)$ (produced by Wako Pure Chemical Industries, Ltd.) and 0.38 g of potassium chloroplatinate $(K_2PtCl_4)$ (produced by Wako Pure Chemical Industries, Ltd.) in 12 ml of water (deoxidized) to prepare a reverse micelle solution (II).

The reverse micelle solution (II) was added in an instant to the reverse micelle solution (I) while the reverse micelle solution (I) was stirred at 22° C. at a high speed by an Omni mixer (manufactured by Yamato Scientific Co., Ltd.). After 10 minutes, the resulting mixture was heated to 50° C. while being stirred by a magnetic stirrer and then matured for 60 minutes.

After mixed with 2 ml of oleic acid (produced by Wako Pure Chemical Industries, Ltd.), the mixture was cooled to room temperature. After the cooling, the mixture was taken out to the atmosphere. In order to break reverse micelles, a mixed solution containing 100 ml of water and 100 ml of methanol was added to the mixture, and an aqueous phase and an oil phase separated. Alloy particles were dispersed in the oil phase. The oil phase was washed five times with a mixed solution containing 600 ml of water and 200 ml of methanol.

Thereafter, 1100 ml of methanol was added to the resulting solution to flocculate and precipitate the alloy particles. The supernatant was removed, and 20 ml of heptane (produced by Wako Pure Chemical Industries, Ltd.) was added to the residue to disperse the particles again.

Further, precipitation caused by adding 100 ml of methanol and dispersion caused by adding 20 ml of heptane after the precipitation were repeated twice. Finally, 5 ml of heptane was added to the resulting solution to prepare an alloy particle-containing solution containing FePt alloy particles with a mass ratio (water/surfactant) of 2.

The yield, the composition, the volume mean diameter, and the distribution (variation coefficient) of the alloy particles obtained as described above were measured, and the results as shown below were obtained.

The composition and the yield were measured by ICP spectroscopic analysis (inductively coupled high frequency plasma spectroscopic analysis).

The volume mean diameter and the distribution were calculated by measuring the particles photographed by a TEM (transmission electron microscope, manufactured by Hitachi Ltd., 30 kV) and processing the measurements statistically.

The alloy particles for measurement were collected from the prepared alloy particle-containing solution, sufficiently dried, and heated in an electric furnace.

Composition: FePt alloy with 44.5 at % of Pt
Yield: 85%
Mean particle diameter: 4.2 nm
Variation coefficient: 5%

Oxidation

The alloy particle-containing solution prepared was concentrated by vacuum degassing so that the amount of the alloy particles became 4% by mass. After the concentration, the pressure was set to a normal pressure, and oxygen gas was supplied to the concentrated alloy particle-containing solution in order to oxidize the alloy particles. The solvent evaporating during the oxidation was compensated by adding heptane. After the oxidation, 0.04 ml of oleylamine was added per ml of the alloy particle-containing solution.

Examples 1–9 and Comparative Examples 1 and 2

The following supports, attaching sequences and methods were used to produce magnetic particle coated materials.

The attaching sequences and methods used in Examples 1 to 9 and Comparative Examples 1 and 2 are given in Table 1 below.

Attaching Sequences

Method (1)

Two disk-shaped supports (formed of glass or polyimide and having a thickness of 0.07 mm) having an outer diameter of 2.5 inches (i.e., 63.5 mm) and an inner diameter of 0.8 inches (i.e., 20.3 mm) with a central hole were prepared. The oxidized alloy particle-containing solution was applied onto one surface (i.e., a first surface) of each of the supports by a spin coater. The coating amount of the solution was adjusted such that the amount of the alloy particles became 0.5 g/m$^2$.

After the coating, annealing was carried out by heating at a temperature rising rate of 50° C./min in an infrared furnace (450° C.) under atmosphere of mixed gas containing 4% of $H_2$ and 96% of $N_2$ for 30 minutes, and cooling to room temperature at a temperature decreasing rate of 50° C./min to produce a support having on one surface thereof a magnetic layer (film thickness: 50 nm) containing the magnetic particles. Subsequently, the pair of supports were attached to each other by the attaching method shown in Table 1 to produce a magnetic particle coated material.

The aforementioned annealing was simultaneously carried out on the pair of supports in the same furnace.

Method (2)

Two disk-shaped supports (formed of polyimide and having a thickness of 0.07 mm) having an outer diameter of 5.5 inches (i.e., 139.7 mm) and an inner diameter of 0.8 inches (i.e., 20.3 mm) with a central hole were prepared. The alloy particle-containing solution was applied onto the pair of supports, and the supports were annealed and attached to each other in the same way as in method (1). Subsequently, the attached supports were punched out into a disk having an outer diameter of 2.5 inches and an inner diameter of 0.8 inches with a hole to produce a magnetic particle coated material.

The aforementioned annealing was simultaneously carried out on the pair of supports in the same furnace.

Method (3)

A magnetic layer was formed on one surface of a support (formed of glass or polyimide and having a thickness of 0.07 mm). Thereafter, the oxidized alloy particle-containing solution was applied onto the other surface (i.e., a second surface) of the support by a spin coater. The coating amount was adjusted so that the amount of the alloy particles became 0.5 g/m$^2$. After the coating, annealing was carried out by heating at a temperature rising rate of 50° C./min in an infrared furnace (450° C.) under atmosphere of mixed gas containing 4% of $H_2$ and 96% of $N_2$ for 30 minutes, and cooling to room temperature at a temperature decreasing rate of 50° C./min to form another magnetic layer (film thickness: 50 nm) on the other surface of the, support, whereby a magnetic particle coated material having magnetic layers on the surfaces of the support was produced.

Since the support was deformed during the annealing, this magnetic particle coated material had portions where the magnetic layer was not uniform. Therefore, a portion of the material where the magnetic layer was uniform was used for the evaluation, which will be described later.

Attaching Methods (1) Method in which a "UV Curable Resin" is Used

An epoxy delayed effective UV curable resin (produced by Sony Chemicals Corporation, trade name: SK-7000) was applied onto each of a pair of supports on a surface having no magnetic layer formed thereon. The epoxy delayed effective UV curable resin applied was irradiated with ultraviolet light at 300 mJ/cm$^2$. Subsequently, the pair of supports were attached to each other via an intermediate support such that the surfaces of the supports coated with the UV curable resin faced the intermediate support, and were pressed against each other at a pressure of 20 gf/cm$^2$ (0.196 Pa) for about 10 minutes.

In a case in which no intermediate support was used, a pair of magnetic particle coated materials were directly attached to each other.

The epoxy delayed effective UV curable resin had a viscosity of 8,000 cps (8 Pa·s), and the adhesive layer had a thickness of 5 μm.

(2) Method in which a "Double-Sided Tape" is Used

A pair of supports were attached to each other via an intermediate support by placing a double-sided adhesive tape between a surface of each of the pair of supports having no magnetic layer formed thereon and the intermediate support, and pressing against each other at a pressure of 20 gf/cm$^2$ (0.196 Pa) for about 1 minute.

In a case in which no intermediate support was used, a pair of supports were directly attached to each other.

A silicone adhesive was used for the double-sided adhesive tape, and the amount of the adhesive was adjusted so that a layer of the adhesive after the attachment had a thickness of 20 μm.

(3) Method in which a "Hot-Melt Adhesive" is Used

A pair of supports with an intermediate support being interposed therebetween were attached to each other with a hot-melt adhesive.

First, the hot-melt adhesive was applied by spin coating onto each of the pair of supports on a surface having no magnetic layer formed thereon. The intermediate support and the surfaces of the supports having no magnetic layers formed thereon were faced and pressed against each other at a pressure of 500 gf/cm$^2$ (4.9 Pa) for about 3 minutes to attach the pair of supports to each other via the intermediate support.

In a case in which no intermediate support was used, a pair of supports were directly attached to each other.

The hot-melt adhesive that was used mainly contained a base polymer formed by a SEPS block copolymer; a tackifier of a terpenephenol resin; wax formed of a low molecular weight polypropylene; an antioxidant; and a process oil component. This hot-melt adhesive had a softening point of 80° C. and a melt viscosity of 900 cps (0.9 Pa·s) at 120° C.

Evaluation

The magnetic property of each of the magnetic layers formed on the surfaces of the magnetic particle coated materials produced in Examples and Comparative Examples was evaluated, and the particle size (particle diameter) of the particles included in the magnetic layers was measured. In evaluating the magnetic property of each of the magnetic layers formed on the surfaces of the supports, magnetic particles of the magnetic layer formed on the surface to be evaluated were scraped with sand paper from the magnetic layer so that the other surface of the support was not affected by the evaluation, and the scraped magnetic particles were used as a sample for evaluation. The results are shown in Table 1.

The magnetic property (measurement of coercive force) was measured for each of the magnetic layers formed on the surfaces of each support. Specifically, the magnetic layer was magnetized by a magnetizer (manufactured by Toei Industry Co., Ltd.) with a magnetic field of 5530 kA/m (70 kOe) and evaluated using a VSM and a DATA processing apparatus (both manufactured by Toei Industry Co., Ltd.) under a condition of applied magnetic field of 1264 kA/m (16 kOe).

The particle diameter of the magnetic particles scraped from the magnetic layer formed on the surface to be evaluated, was measured by a TEM "JEOL 2000 FX" (manufactured by Nippon Electronic Company) having an acceleration voltage of 200 kV.

coated materials in Comparative Examples 1 and 2. Further, since the one surface (i.e., the first surface) was annealed twice, the particles flocculated, thereby forming large-sized particles.

What is claimed is:

1. A magnetic particle coated material comprising:
    a first support having a magnetic layer formed on one surface thereof; and
    a second support having a magnetic layer formed on one surface thereof,
    wherein the first support and the second support are attached to each other so that the other surfaces having no magnetic layers formed thereon face each other, and each magnetic layer comprises magnetic particles having a CuAu-type or $Cu_3Au$-type ferromagnetic ordered alloy phase,
    wherein the coercive force A of the magnetic layer on the first support and the coercive force B of the magnetic layer on the second support satisfy the expression $0.8 \leq A/B \leq 1.2$.

2. A magnetic particle coated material comprising:
    a first support having a magnetic layer formed on one surface thereof; and
    a second support having a magnetic layer formed on one surface thereof,
    wherein the first support and the second support are attached to each other so that the other surfaces having no magnetic layers formed thereon face each other, and

TABLE 1

| | Attaching sequence | Type of support | Attaching method | Intermediate support | Coercive force (kA/m) First surface | Coercive force (kA/m) Second surface | Particle diameter (nm) First surface | Particle diameter (nm) Second surface |
|---|---|---|---|---|---|---|---|---|
| Example 1 | Method (1) | Glass | UV curable resin | None | 316 | 317.2 | 5 | 5 |
| Example 2 | Method (1) | Glass | Double-sided tape | None | 315.6 | 316.8 | 5 | 5 |
| Example 3 | Method (1) | Glass | Hot-melt adhesive | None | 316.8 | 317.2 | 5 | 5 |
| Example 4 | Method (1) | Polyimide | UV curable resin | Polycarbonate | 236.2 | 237.4 | 5 | 5 |
| Example 5 | Method (1) | Polyimide | Double-sided tape | Polycarbonate | 237 | 238.2 | 5 | 5 |
| Example 6 | Method (1) | Polyimide | Hot-melt adhesive | Polycarbonate | 236.6 | 237.8 | 5 | 5 |
| Example 7 | Method (2) | Polyimide | UV curable resin | Polycarbonate | 237 | 237.4 | 5 | 5 |
| Example 8 | Method (2) | Polyimide | Double-sided tape | Polycarbonate | 237 | 237 | 5 | 5 |
| Example 9 | Method (2) | Polyimide | Hot-melt adhesive | Polycarbonate | 237.4 | 237 | 5 | 5 |
| Comparative Example 1 | Method (3) | Glass | . . . | None | 395 | 316 | 5 to 15 | 5 |
| Comparative Example 2 | Method (3) | Polyimide | . . . | None | 300.2 | 237.4 | 5 to 15 | 5 |

According to Table 1, each of the magnetic particle coated materials in Examples 1 to 9 produced by attaching the pair of supports to each other has substantially the same magnetic property on both surfaces. Further, the magnetic particle coated materials in Example 1 to 9 have excellent magnetic layers with a particle diameter of 5 nm and no flocculation.

In contrast, there is a great difference in the magnetic property between the surfaces of the magnetic particle each magnetic layer comprises magnetic particles having a CuAu-type or $Cu_3Au$-type ferromagnetic ordered alloy phase,
wherein the coercive force A of the magnetic layer on the first support and the coercive force B of the magnetic layer on the second support satisfy the expression $0.9 \leq A/B \leq 1.1$.

* * * * *